United States Patent [19]
Yamazaki et al.

[11] Patent Number: 5,786,532
[45] Date of Patent: Jul. 28, 1998

[54] BRAKE FIT ADJUSTER

[75] Inventors: Makoto Yamazaki; Hitoshi Morita, both of Suzuka; Kyoichi Nishiwaki, Kameyama, all of Japan

[73] Assignee: Honda Giken Kogyo Kabushiki Kaisha, Tokyo, Japan

[21] Appl. No.: 796,993

[22] Filed: Feb. 7, 1997

[51] Int. Cl.[6] ............................................. G01L 5/28
[52] U.S. Cl. ............................................. 73/121; 73/132
[58] Field of Search ........................... 73/121, 122, 123, 73/130, 131, 132; 340/453, 454

[56] References Cited

U.S. PATENT DOCUMENTS

| | | | |
|---|---|---|---|
| 1,568,803 | 1/1926 | Cowdrey | 73/130 |
| 1,686,229 | 10/1928 | Diderrich | 73/130 |
| 1,775,541 | 9/1930 | Zechlin | 73/130 |
| 1,894,174 | 1/1933 | Harth | 73/131 |
| 1,944,344 | 1/1934 | Holmes | 73/130 |
| 1,970,211 | 8/1934 | Wilkoff | 73/130 |
| 2,000,289 | 5/1935 | Kramer | 73/130 |
| 2,025,692 | 12/1935 | Packard | 73/130 |
| 2,151,134 | 3/1939 | Mitchell | 73/130 |
| 3,602,044 | 8/1971 | Markey | 73/130 |
| 3,824,847 | 7/1974 | Chambers | 73/132 |
| 3,877,299 | 4/1975 | Clayton et al. | 73/132 |
| 3,974,687 | 8/1976 | Asmus et al. | 73/132 |
| 3,982,429 | 9/1976 | Cline | 73/132 |

*Primary Examiner*—George M. Dombroske
*Attorney, Agent, or Firm*—Pollock, Vande Sande & Priddy

[57] ABSTRACT

A brake fit adjuster supports a brake drum on a rotatable drum support 20. A brake shoe unit is locked on a mounting mechanism 40. A brake fit is adjusted by applying a pulling force on a wire harness and pressing a brake shoe unit against the inner surface of the rotating brake drum by applying a preset force on the brake shoe unit connected to one end of the wire harness.

3 Claims, 4 Drawing Sheets

BRAKE FIT ADJUSTER

FIELD OF THE INVENTION

This invention relates to apparatus for bringing brake shoes and brake drums into a good fit.

BACKGROUND OF THE INVENTION

A parking brake in an automobile is generally a drum brake fitted in a disk brake. However, the freshly assembled brake shoe and drum brake do not provide a snug fit.

When checking the braking force of a parking brake, accordingly, the brake shoe and drum brake must be brought into a good fit by making a preliminary adjustment. This adjustment is done by pressing the brake shoe against the rotating brake drum by pulling a wire harness.

The inventor disclosed an apparatus that achieves a good fit by pressing a brake shoe against a brake drum rotating in the same position as during running in Japanese Provisional Patent Publication No. 194424 of 1992. This apparatus comprises a lever pivotally supported at the center thereof that applies a pulling force on a wire harness connected to one end thereof when the other end thereof is pressed by a pressing member.

With the brake drum mounted on the brake shoe unit, however, this apparatus requires that the drum driving and elevating mechanisms must be disposed in the upper part of the apparatus. Such a design could produce instability, complicate the design with spindles and other members involved, and require a detecting device to stop the drum support at the desired position in order to engage and hold the brake drum. Because the tip of the lever moves in an arc, in addition, it becomes difficult to determine an accurate pulling load as the length of the wire harness increases. All things considered, the above-described apparatus has several points for improvement.

SUMMARY OF THE INVENTION

An object of this invention is to provide an apparatus that permits a much more efficient fit adjustment than before by facilitating mounting and removing of a brake and a brake shoe unit while increasing the stability of the apparatus by eliminating the imbalance between the upper and lower parts thereof.

Another object of this invention is to provide an apparatus that adjusts a fit between the brake shoe and brake drum by detecting and maintaining at a preset level the pressing force exerted by the brake shoe.

DETAILED DESCRIPTION OF PREFERRED EMBODIMENT

Figure 1:
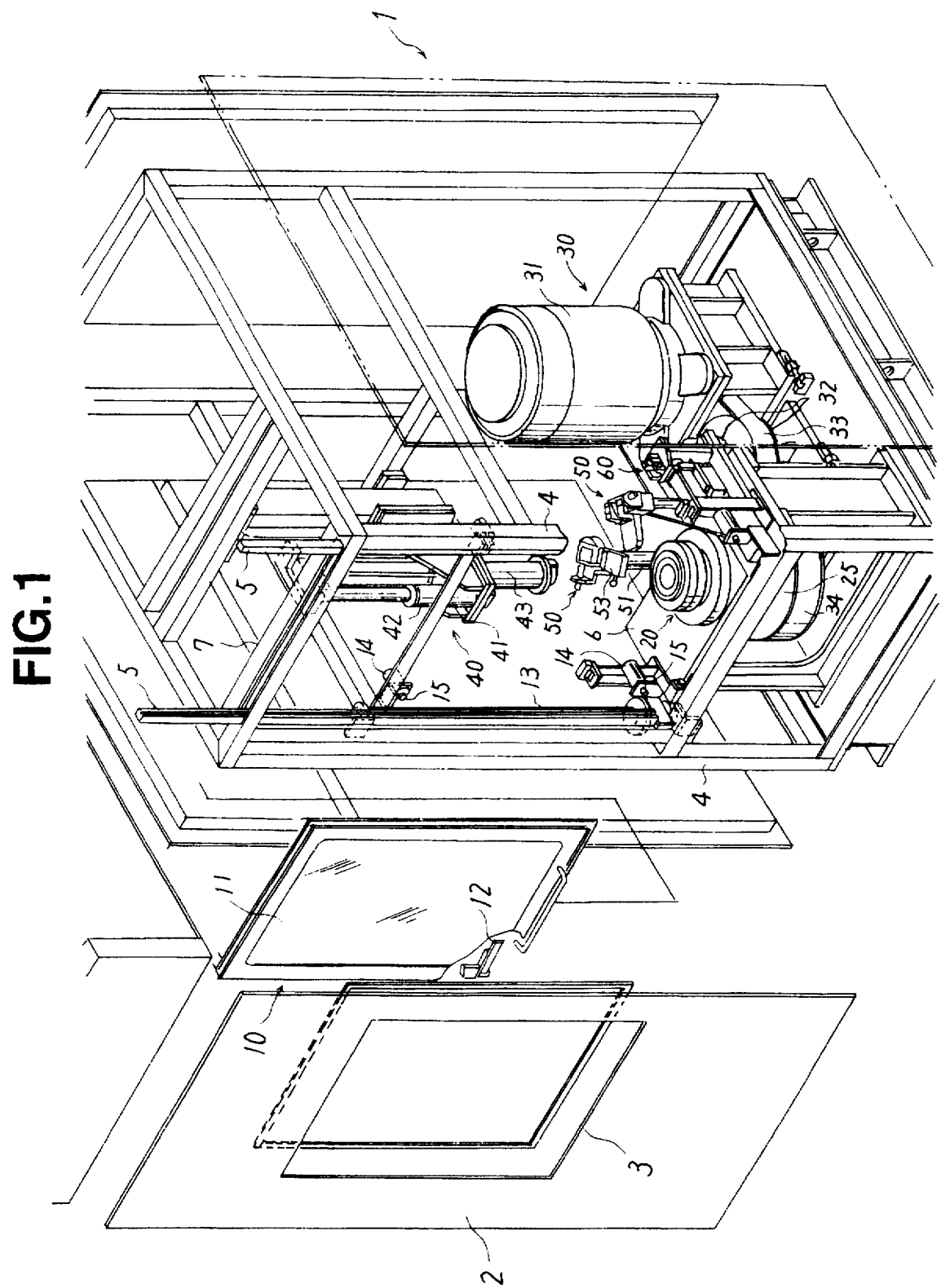
FIG. 1 is a general perspective view of an embodiment of this invention.

Referring first to FIG. 1, a brake fit adjuster of this invention comprises a sealing mechanism 10 to seal an opening 3 in a casing 1, a rotatable drum support 20 that supports a brake drum, a drum rotating mechanism 30 that rotates the drum support 20, a brake unit elevator 40 that moves up and down a brake shoe unit B that is mounted on a brake drum D, brake shoe unit locking mechanisms 50 that lock the brake shoe unite B on the brake drum D, and a brake shoe pressing mechanism 60 that brings the brake shoe into contact with the brake drum D.

Details of the individual components are described below.

The opening 3 is provided in the front cover 2 of the casing 1 so that the brake shoe unit B and brake drum D are mounted and removed therethrough. A door 11 constituting the sealing mechanism 10 is provided so as to move up and down driven by a rodless cylinder 13 and guided slide rails 5 fastened to frames 4 on both sides of the door.

Sealing cylinders 14 are provided on the frames 4 at positions corresponding to the four corners of the opening 3. When the door 11 closes the opening 3, cylinder rods 15 press contact members 12 at the four corners of the door 11 from inside. The door 11 thus pressed against the edges of the opening 3 prevents the leakage of noise from inside the casing 1.

Figure 2:
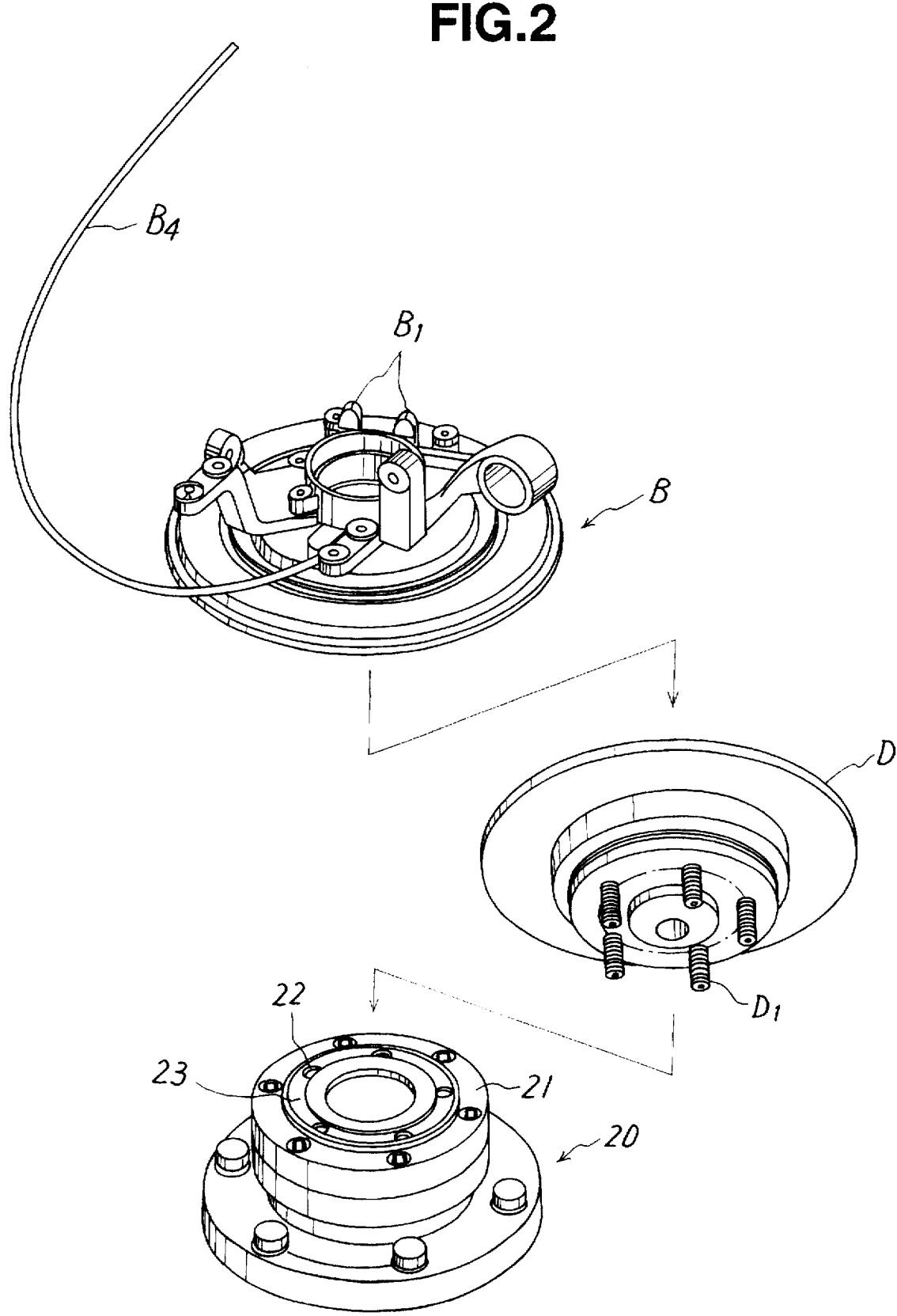
FIG. 2 is a perspective view showing a brake drum and a brake shoe unit mounted on a drum support member.

The drum support 20 to support the brake drum D oriented right side up is rotatably mounted on a support frame 6 near the opening 3 in the casing 1. The drum support 20 has holes 22 in the top surface 21 thereof to admit bolts D1 on the bottom surface of the brake drum D and an annular guide groove 23 connecting the holes 22, as shown in FIG. 2. When the drum support 20 holding the brake drum D thereon rotates, the bolts D1 fit into the holes 22 to lock the brake drum D in position.

The drum support 20 also has a shaft extending downward through the support frame 6, with a pulley 25 that rotates integrally with the drum support 20 fastened to the lower end thereof. Belts 33 and 34 from the drum rotating mechanism 30 run over the pulley 25 via intermediate pulleys 32. A drive motor 31 constituting the drum rotating mechanism 30 rotates the drum support 20.

A brake shoe unit mounting mechanism 40 fastened to an upper frame 7 is provided above the drum support 20. The brake shoe unit mounting mechanism 40 comprises a cylinder 42 that moves up and down a mechanism assembly 41 and a holder 43 that holds the brake shoe unit B placed below the mechanism assembly 41. When lowered, the holder 43 places the brake shoe unit B on the brake drum D.

The brake shoe unit locking mechanisms 50 that stop the rotation of the brake shoe unit B and the brake shoe pressing mechanism 60 that presses the brake shoe against the brake drum D are provided beside the position where the brake shoe unit B is placed.

The brake shoe unit locking mechanisms 50 are mounted on the support frame 6 in a position corresponding to the brake shoe units B of both rear wheels and substantially equal to the level of the brake shoe unit B mounted in position and placed near the periphery of the drum support 20.

Figure 3A:
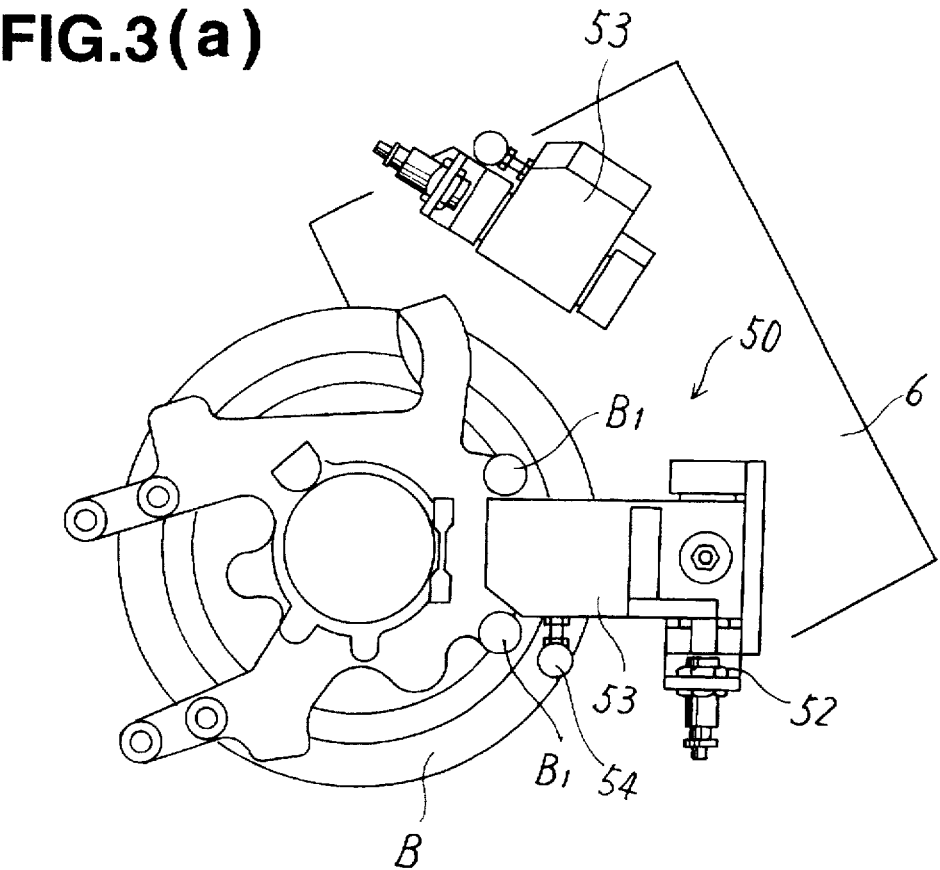
FIG. 3(a) and (b) are a top view and a side elevation of a mechanism to stop the rotation of a brake shoe unit.
Figure 3B:
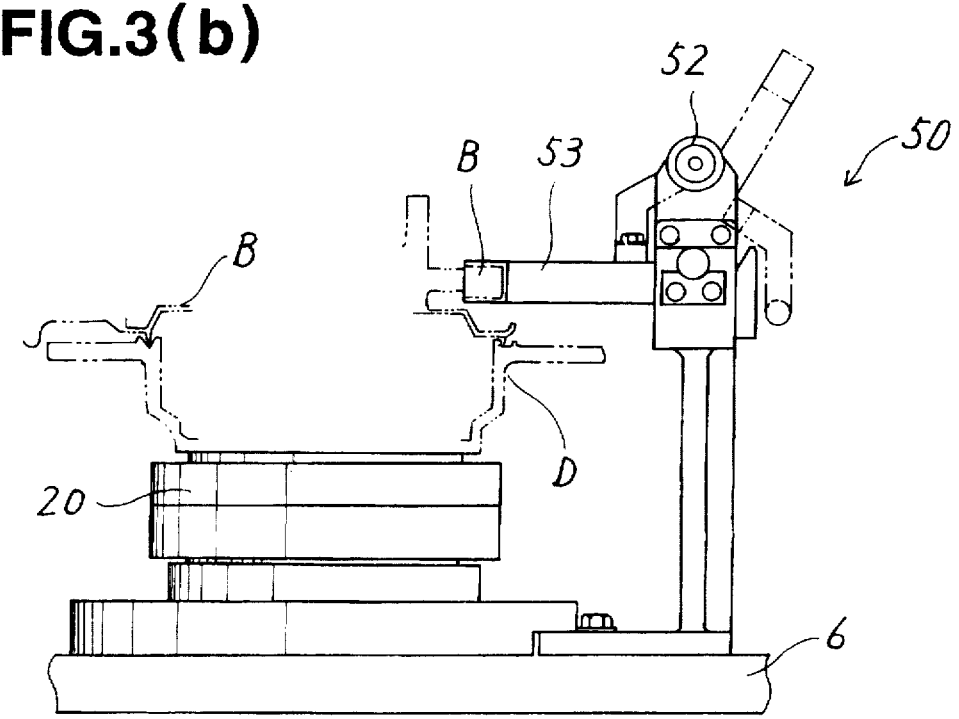

Each brake shoe unit locking mechanism 50 has an engaging lever 53 raised and lowered by a handle 54, as shown in FIG. 3(a). The engaging lever 53 prevents the brake shoe unit B from rotating on the brake drum D when inserted between two projections B1 and B1 on the brake shoe unit B. A sensor 52 detects the position where the engaging level engages and disengages.

The brake shoe pressing mechanism 60 presses the brake shoe against the brake drum D when the parking brake wire B4 is pulled. The brake shoe pressing mechanism 60 is mounted on the support frame in a position substantially equal to the level of the brake shoe unit B mounted in positioned and placed near the periphery of the drum support 20 as in the case of the brake shoe unit locking mechanisms that are also mounted thereon.

Figure 4:
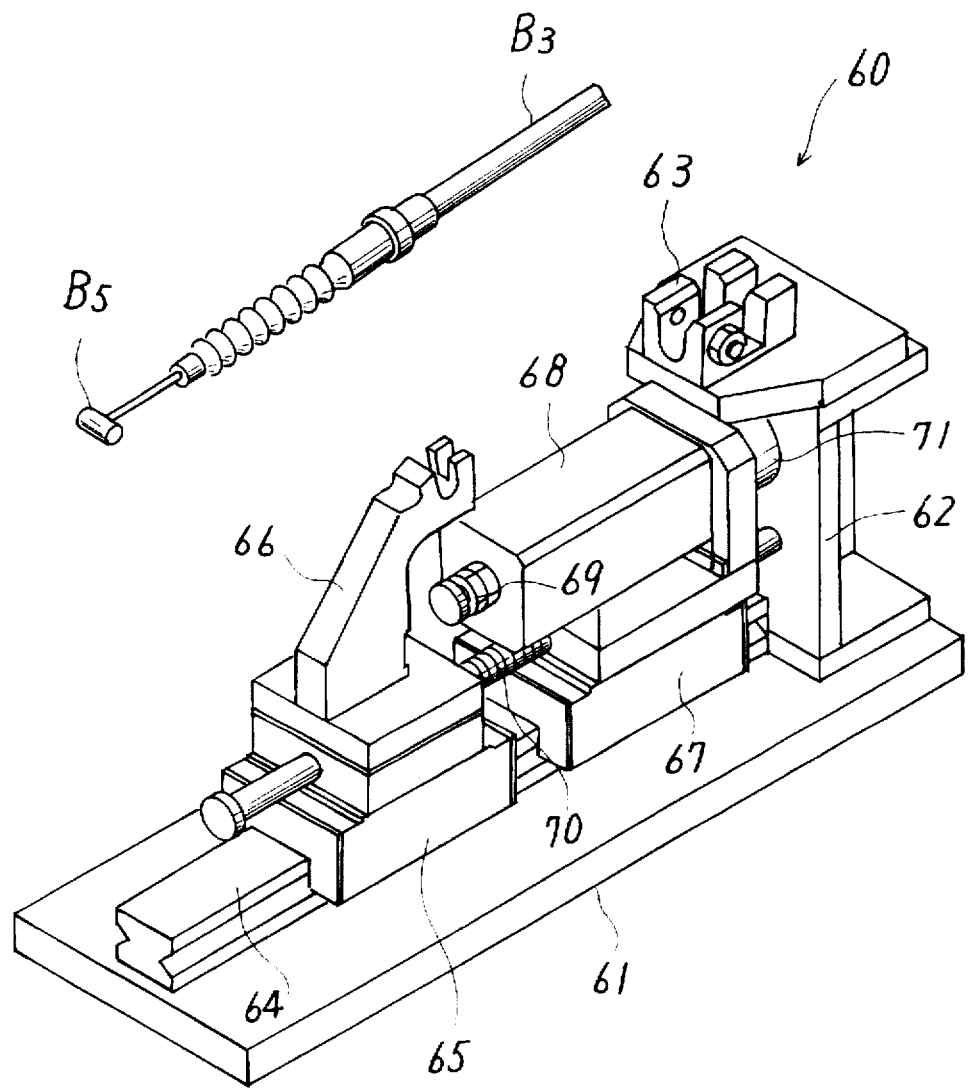
FIG. 4 is a perspective view of a brake shoe drive mechanism.

The brake shoe pressing mechanism 60 comprises, a wire harness support 63 fastened to one end of a base plate 61 via a stationary plate 62, a holder 66 that holds an end of the wire harness movably provided on a slide rail 64 disposed on the base plate 61 via a movable table 65, and a cylinder 68 provided between the wire harness support 63 and the holder 66 via a support table 67, as shown in FIG. 4. With the wire harness support 63 supporting one end of the wire harness B3 and the holder 66 holding an end B5 thereof, the rod 69 of the cylinder 68 moves the holder 66 in the direction in which the wire harness B3 is pulled. Then, a brake shoe, not shown, connected to the other end of the wire harness B3 is pressed against the brake drum D.

To be more specific, a compression spring 70 interposed between the movable table 65 and the support table 67 constantly urges the movable table 65 in the direction in which the wire harness B3 is pulled. Thus, the end B5 of the wire harness B3 can be engaged with the holder 66 without loosening the wire harness B3 by moving the movable table 65 in the direction in which the compression spring 70 is compressed. A load cell 71 provided between the support table 67 and the stationary table 62 detects the pulling load working on the wire harness B3. This permits pressing the brake shoe against the brake drum with a force.

The brake fit adjustment achieved by the apparatus described above is described below.

First, an operation button not shown is pushed to actuate the rodless cylinder 13 to slide the door 11 upward. Then, the brake drum D is inserted through the opening 3 in the front cover 2 and mounted right side up on the drum support 20.

The bolts D1 projecting from the bottom surface of the brake drum D fit in the guide groove 23 in the top surface of the drum support 20. By rotating the drum support 20 slightly, the bolts D1 fit in the holes 22, thereby locking the brake drum D on the drum support 20.

Next, the brake shoe unit B attached to the bottom end of the holder 43 is placed on the brake drum D by actuating the elevating cylinder 42. Then, one end B5 of the wire harness B3 is engaged with the holder 66 by moving the movable table 65 to the right in FIG. 4 against the force exerted by the compression spring 70. By moving either of the two handles 54, the appropriate engaging lever 53 is inserted between the projections B1 and B1 on the brake shoe unit B to lock the brake shoe unit B in position.

After this, the operation button is pressed again to reverse the rodless cylinder 13 to close the door 11. Then, the cylinder rods 15 of the sealing cylinders 14 at the four corners of the opening 3 press the four corners of the door 11 against the edges of the opening 3 to prevent the leakage of noise from inside.

With the above preparation done, the brake shoe pressing mechanism 60 is actuated to cause the piston rod 69 extending from the cylinder 68 to move the holding member 66 to the left as shown in FIG. 4. Then, the end B5 of the wire harness B3 is pulled and the pressure applied thereto is transmitted through the parking brake wire B4 connected thereto to the brake shoe unit B, pressing the brake shoe unit against the inner surface of the brake drum D.

Then, a reaction force equal to the load applied on the wire harness B3 works on the load cell 71. While keeping the force with which the brake shoe is pressed at a preset level based on the detected force, a fit between the brake shoe and the inner surface of the brake drum is adjusted by rotating the brake drum D on the drum support 20 by the drive motor 31.

Finally, the sealing cylinders 14 are released to raise the door 11 and the elevating cylinder 42 is actuated to separate the brake shoe unit B from the brake drum D, which are then withdrawn from the casing 1 for mounting on a vehicle and subjected to a final braking force inspection.

What is claimed is:

1. A brake fit adjuster, comprising:

a rotatable drum support for supporting a brake drum right side up;

a brake shoe unit mounting mechanism for elevating a brake shoe unit and holding and mounting the brake shoe unit on the brake drum;

a brake shoe unit locking mechanism for preventing the rotation of the brake shoe unit by engaging a portion of the brake shoe unit; and a brake shoe unit pressing mechanism for pressing the brake shoe unit against a surface of the brake drum, said pressing mechanism including a tightening wire having a first end connected to the brake shoe unit for transmitting to the brake shoe unit a pressing force corresponding to a tensile force applied to the wire.

2. The brake fit adjuster according to claim 1, wherein a top surface of the drum support includes:

a plurality of holes for receiving bolts projecting from a bottom surface of the brake drum, and an annular bolt guide groove connecting said holes.

3. The brake fit adjuster according to claim 1, further comprising:

a cylinder for applying a tightening force to a second end of said tightening wire; and a load cell for detecting a force applied to the brake shoe unit by the tightening wire.

* * * * *